United States Patent [19]

Stefanati et al.

[11] Patent Number: 4,755,121
[45] Date of Patent: Jul. 5, 1988

[54] MACHINE FOR PRODUCING DUMPLINGS OR TROFFIETTE

[76] Inventors: Paola Stefanati; Roberta Stefanati; Andrea Stefanati, all of Via Bainsizza 38/6, I-16141 Genova, Italy

[21] Appl. No.: 64,590

[22] Filed: Jun. 22, 1987

[30] Foreign Application Priority Data

Jul. 18, 1986 [IT] Italy .................................. 12513 A/86

[51] Int. Cl.$^4$ ............................................. A01J 21/00
[52] U.S. Cl. .................................... 425/239; 425/297; 425/305.1; 425/307; 425/313
[58] Field of Search .............. 425/239, 289, 296, 297, 425/305.1, 306, 307, 310, 311, 313

[56] References Cited

U.S. PATENT DOCUMENTS

| | | | |
|---|---|---|---|
| 678,635 | 7/1901 | Battenfeld | 425/297 |
| 902,088 | 10/1908 | Kintner | 425/311 |
| 1,169,472 | 1/1916 | Embrey | 425/296 |
| 1,730,932 | 10/1929 | Glisce | 425/297 |
| 2,278,513 | 4/1942 | Emerson | 425/296 |

Primary Examiner—Bernard Nozick
Attorney, Agent, or Firm—Larson and Taylor

[57] ABSTRACT

A machine for producing small dumplings having the shape of helically-grooved spindles, so-called "troffiette", comprising a feeding unit designed to produce roundish raw dumplings from a pre-worked dough and to feed them sequentially to a co-operating forming unit which, first, turns them into plain dough-spindles and, then, into "troffiette" proper, characterized in that said feeding unit comprises a dough-receiving hopper including therein a screw-feeder designed to progressively advance said dough to at least one extruder funnel communicating with the body of said hopper and adapted to expel said dough in the shape of a continuous rod which is cut into pieces by a rotary cutter member arranged at the outlet of said extruder funnel, said pieces constituting the raw dumplings which are sequentially fed through a suitable chute to a conveyor belt exactly at the inlet of the forming tunnel.

9 Claims, 3 Drawing Sheets

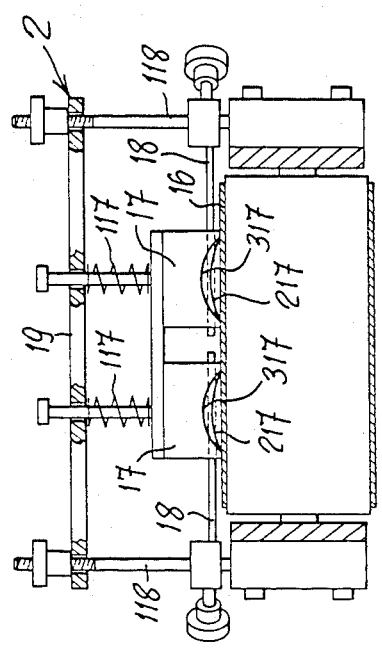
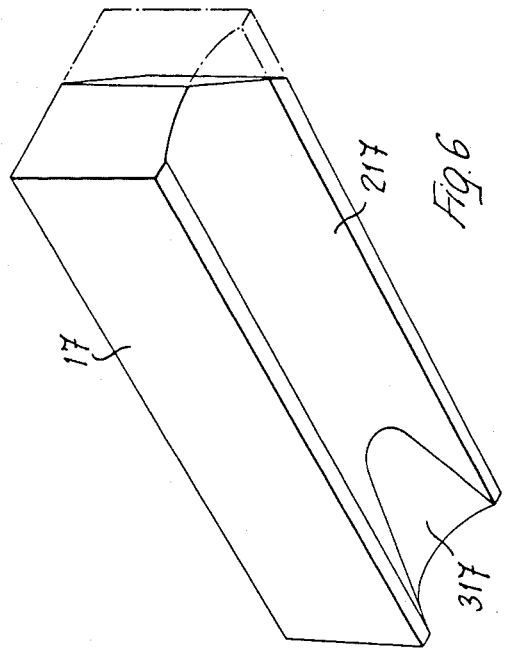
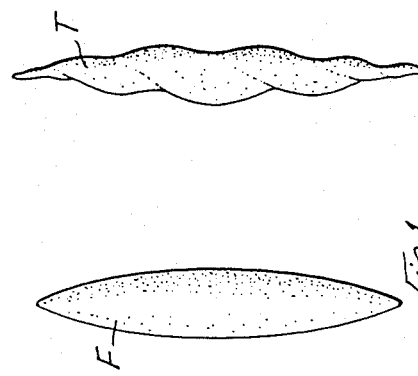
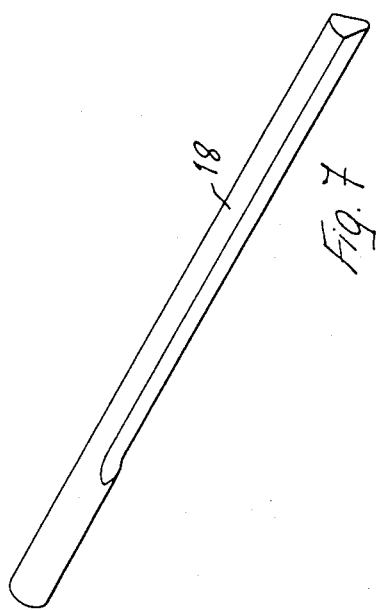

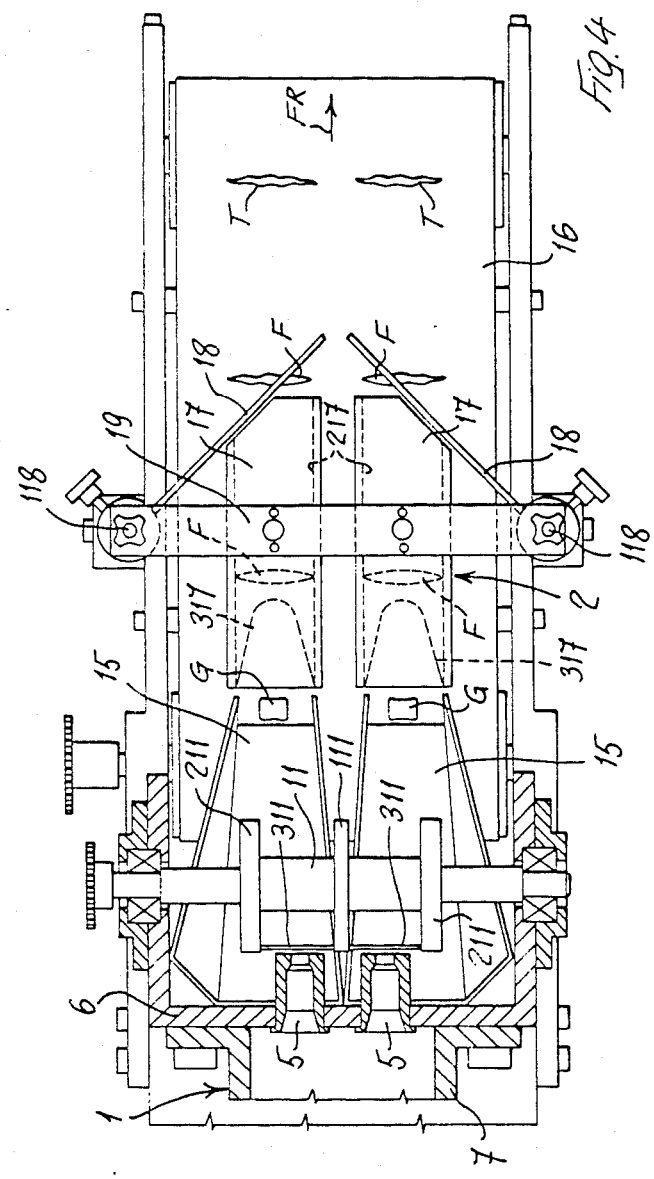

MACHINE FOR PRODUCING DUMPLINGS OR TROFFIETTE

SUMMARY OF THE INVENTION

This invention relates to the production of a particular type of edible dumpling, so-called "troffietta" which, as is known, is in the form of a small spindle-shaped and helically-grooved dumpling. More particularly, the invention relates to a machine for producing said "troffiette", of the type wherein an endless conveyor belt co-operates with at least one suitably-shaped forming tunnel thereabove, so as to convey the raw-shaped roundish dumplings fed to said belt, after each other throughout said tunnnel, whereby to turn them into plain spindle-shaped pieces, called spindles, which at or near the outlet of said forming tunnel are engaged, one by one, under a shaper member which forms in said spindles the particular helical groove which is a characteristic of the "troffiette".

A machine of this type requires that the raw dumplings are supplied properly to said conveyor belt, since this affects the quantitative and qualitative productivity level, as well as the operative reliability of the machine.

This invention provides a machine for producing "troffiette" of the type described, comprising a unit for feeding the raw dumplings onto the conveyor belt, ensuring their suitable form, suitable rate of feeding and perfect introduction into the forming tunnel.

Said feeding unit comprises a hopper for receiving the pre-worked dough, said hopper being provided therein with a screw feeder which advances said dough progressively to at least one extruder funnel communicating with the body of said hopper and expelling the dough in the form of a continuous rod which is cut successively into pieces by a cutter member, preferably of the wire type, arranged at the outlet of said extruder funnel, said pieces constituting the raw dumplings which are sequentially fed onto the conveyor belt, through a suitable chute, exactly at the inlet of said forming tunnel.

In a preferred embodiment, the loading hopper is formed by a cylindrical pot with a frusto-conical lower portion, communicating with a pair of horizontal-axis extruder funnels through an elbow-shaped union, the screw-feeder in the hopper having a vertical axis and a varied pitch and being coupled with an underlying drive shaft by means of a bayonet joint.

BRIEF DESCRIPTION OF THE DRAWINGS

These and other characteristics of the forming machine according to the invention, and the advantages resulting therefrom, will become apparent in the following detailed description of a preferred embodiment thereof, set forth as a non-limiting example and shown in the accompanying sheets of drawings, wherein:

FIG. 1 shows a so-called spindle, i.e. a semi-finished or intermediate dough product formed by the machine of the invention from an original dumpling, to be then converted into a "troffietta".

FIG. 2 shows a finished "troffietta", formed by the machine according to the invention.

FIG. 4 is a top plan view of said machine, some parts being in sectional view.

FIG. 5 is a vertical cross sectional view of said machine, taken on the line V—V of FIG. 3.

FIG. 6 is a perspective bottom view of a forming tunnel for said machine, and

FIG. 7 is a perspective view of a shaping stick for helically grooving the "troffiette".

DESCRIPTION OF THE PREFERRED EMBODIMENT

Figure 3:
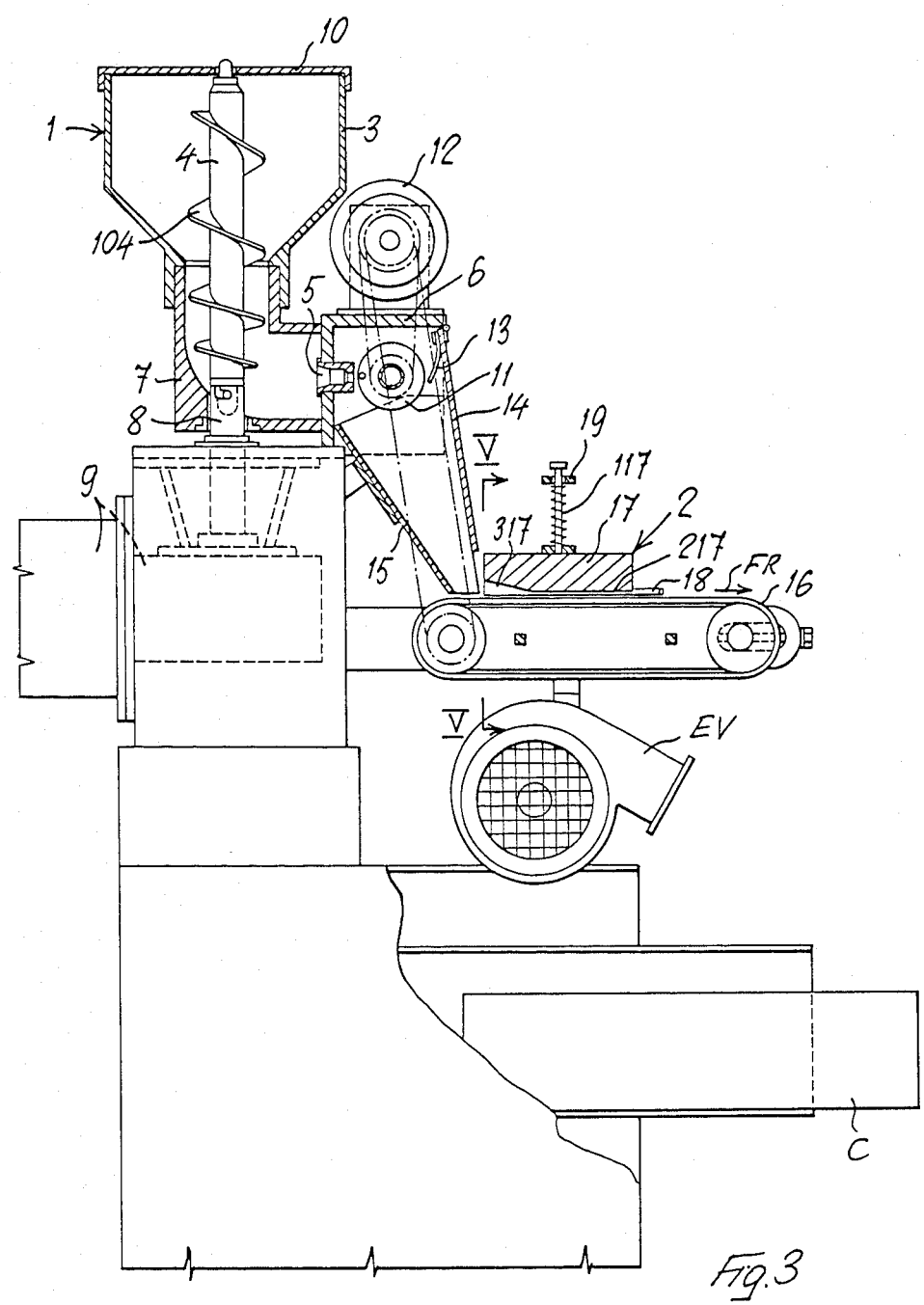
FIG. 3 is a side elevational and partly sectional view of a forming machine for producing "troffiette", according to the invention.

With reference to the drawings, a forming machine for the production of "troffiette" comprises a feeding unit 1 designed to produce raw dumplings G from a pre-worked dough and to feed sequentially said dumplings to a co-operating forming unit 2 which converts said dumplings G into plain spindles F (see FIG. 1) and, thereafter, into "troffiette" T proper (see FIG. 2).

The feeding unit 1 (see FIGS. 3 and 4), which has the most peculiar characteristics of the forming machine according to the invention, comprises a hopper 3 which is loaded with the previously worked dough. Said hopper 3, formed by a cylindrical pot with a frusto-conical lower portion, is equipped therein with a vertical screw feeder 4 which urges the dough toward a pair of horizontal-axis extruder funnels 5 mounted on a box-shaped support 6 and communicating with the bottom of said hopper through a elbow-shaped union 7. The screw feeder 4 is provided with a continuous helix 104 having a downwards progressively-decreasing pitch so as to suitably push the dough, and is coupled at its lower end, through a bayonet joint, with a co-axial drive shaft 8 actuated by a geared motor 9. This solution leaves the mouth of the hopper 3 unhindered to permit an easy loading of the dough, and permits as well an easy removal of the screw-feeder, hopper and elbow-union for cleaning said assembly regularly.

The screw-feeder is rotatably mounted at the top thereof in a cover 10 which is easily removable and provided with a wide loading door (not shown).

Arranged at the outlet of said extruder funnels 5 is a cutting member 11 which severs into pieces the continuous rod of dough extruded from said funnels. Preferably, said cutting member 11 comprises a horizontal rotary spool, actuated by a geared motor 12 and including a horizontal rotary spool, actuated by a geared motor 12 and including one central flange 111 and two side flanges 211, mounting therebetween a tensioned wire 311 which, due to the rotation of the spool, will cut the extruded rods of dough upon each revolution.

The pieces cut from the extruded rods of dough constitute the original dumplings G mentioned above. The detachment of the original dumplings G from the cutting member 11 is ensured by a detachment blade 13. The area where said dumplings are cut is shielded by a hinged door 14 made of transparent material, whereby said area may be inspected continuously.

Once formed, said dumplings G fall onto a pair of chutes 15 that suitably feed them to the forming unit 2 (see FIGS. 3, 4 and 5). Said forming unit 2, which is partly of conventional design, comprises substantially a horizontal conveyor belt 16 which is activated, in the direction of the arrow FR, by the same motor 12 as the cutting member 11, and which co-operates with a pair of parallel forming tunnels 17 held longitudinally in contact with the upper stretch of said conveyor belt by means of compression springs 117. Said tunnels are formed with a double-incline recess 217 (see also FIG. 6).

The dumplings G thus produced are sequentially fed onto the conveyor belt 16 at the inlet mouth 317 of the tunnel 17, so as to be moved along the recess 217 thereof and to be given, therefore, the shape of plain spindles F. At the outlet from the forming tunnels 17, the spindles F are passed under a pair of shaping members constituted by a horizontal stick 18 arranged transversely at a certain angle with respect to the respective tunnel.

According to the invention, said stick 18 (see FIG. 7) has a substantially triangular configuration in cross section. The forced passage of the spindles F under the sticks 18, disposed at a pre-established close distance from the belt 16, imparts said spindles the helical groove that is a distinguishing feature of the "troffiette".

According to the invention, each stick 18 is carried by a side vertical shaft 118 and its level may be adjusted so as to vary the depth of the helical groove in the "troffiette" T. Said shafts 118 also support a bridge transom 19 that supports said tunnels 17. The finished "troffiette", finally, are discharged into a container C therebelow, where they are dried by means of an electrically-controlled fan EV.

It is apparent from the above that the machine according to the invention for producing "troffiette" grants, with respect to the similar conventional machines, several advantages resulting mainly from its feeding unit, such as:

homogeneous and uniform conveyance of the dough to the extruder funnels;
possibility of rapid removal of the loading hopper;
uniformly timed formation of the original dumplings;
accurate feeding of said dumplings to the mouth of each forming tunnel;
perfect formation of the helical grooves in the "troffiette";
possibility to vary the depth of the helical groove in the "troffiette";
perfect drying of the "troffiette".

We claim:

1. A machine for producing a particular type of edible dumpling so-called "troffietta", wherein an endless conveyor belt co-operates with at least one suitably-shaped forming tunnel thereabove so as to convey throughout said tunnel, after each other, roundish original dumplings fed to said belt, so as to convert them into plain spindle-shaped pieces, called spindles, which at or near the outlet of the forming tunnel are engaged, one by one, under a shaper member which forms in said spindles the typical helical groove of the "troffiette", characterized in that it comprises a unit for feeding the original dumplings, said unit including a hopper for receiving the previously-worked dough, provided therein with a screw-feeder to progressively convey said dough to an extruder funnel communicating with the body of said hopper and expelling the dough in the form of a continuous rod which is cut successively into pieces by a rotary cutter member arranged at the outlet of said extruder funnel, said pieces constituting the original or raw dumplings which are sequentially fed onto the conveyor belt, through a suitable chute, exactly at the inlet mouth of the forming tunnel.

2. A machine according to claim 1, comprising a turnover door of transparent material for shielding the area where said original dumplings are cut.

3. A machine according to claim 1, equipped with an electrically-operated fan intended to dry the finished "troffiette" which are discharged into a suitable container.

4. A machine according to claim 1, wherein said hopper is formed by a cylindrical pot with a frusto-conical lower portion, communicating with a pair of horizontal-axis extruder funnels through an elbow-shaped union, said screw-feeder in the hopper having a vertical axis and a varied pitch and being coupled with an underlying drive shaft by means of a bayonet joint.

5. A machine according to claim 4, wherein said hopper is provided at the top thereof with an easily removable cover provided with a wide loading door.

6. A machine according to claim 1, wherein said cutting member comprises a horizontal-axis rotary spool having a central flange and two side flanges mounting therebetween two tensioned and aligned cutting wires.

7. A machine according to claim 6, wherein said cutting member is operatively associated with a detached therefrom.

8. A machine according to claim 1, wherein said shaper member is formed by a horizontal stick having a substantially triangular cross section arranged transversely at a certain angle at the outlet of the respective shaping tunnel.

9. A machine according to claim 8, wherein said shaper stick is mounted on a respective side vertical shaft so that its level may be adjusted.

* * * * *